(12) United States Patent
Yang et al.

(10) Patent No.: US 10,316,662 B2
(45) Date of Patent: *Jun. 11, 2019

(54) CONSTRUCTION LAYOUT FOR UNDERGROUND CAVERNS IN NUCLEAR ISLAND POWERHOUSE OF UNDERGROUND NUCLEAR POWER PLANT

(71) Applicant: CHANGJIANG SURVEY PLANNING DESIGN AND RESEARCH CO., LTD., Wuhan (CN)

(72) Inventors: Qigui Yang, Wuhan (CN); Xinqiang Niu, Wuhan (CN); Lixin Liu, Wuhan (CN); Baixing Liu, Wuhan (CN); Xin Zhao, Wuhan (CN); Lijun Su, Wuhan (CN); Feng Li, Wuhan (CN); Xuehong Yang, Wuhan (CN); Zhijun Zhang, Wuhan (CN); Zhengjian Miu, Wuhan (CN); Zhiguo Zhang, Wuhan (CN); Haibo Liu, Wuhan (CN); Tieling Tao, Wuhan (CN); Yanlei Wan, Wuhan (CN)

(73) Assignee: CHANGJIANG SURVEY PLANNING DESIGN AND RESEARCH CO., LTD., Wuhan (CN)

(*) Notice: Subject to any disclaimer, the term of this patent is extended or adjusted under 35 U.S.C. 154(b) by 347 days.

This patent is subject to a terminal disclaimer.

(21) Appl. No.: 15/376,602

(22) Filed: Dec. 12, 2016

(65) Prior Publication Data
US 2018/0003054 A1 Jan. 4, 2018

Related U.S. Application Data

(63) Continuation-in-part of application No. PCT/CN2015/079879, filed on May 27, 2015.

(30) Foreign Application Priority Data

Jun. 13, 2014 (CN) .......................... 2014 1 0264520
Jun. 13, 2014 (CN) ..................... 2014 2 0316976 U

(51) Int. Cl.
*G21D 1/00* (2006.01)
*G21D 1/02* (2006.01)
(Continued)

(52) U.S. Cl.
CPC ............. *E21D 13/00* (2013.01); *E02D 29/04* (2013.01); *E21D 9/14* (2013.01); *G21D 1/00* (2013.01); *G21C 1/00* (2013.01); *Y02E 30/40* (2013.01)

(58) Field of Classification Search
CPC ....... E02D 29/04; E02D 29/045; E21D 13/00; G21D 1/00; G21D 1/02; Y02E 30/40
See application file for complete search history.

(56) References Cited

U.S. PATENT DOCUMENTS 2,896,417 A * 7/1959 Meade ..................... F17C 3/005
405/53
2,928,248 A * 3/1960 Hubbell ................... B65G 5/00
299/19

(Continued)

*Primary Examiner* — Frederick L Lagman
(74) *Attorney, Agent, or Firm* — Matthias School P.C.; Matthias Scholl

(57) ABSTRACT

A construction layout for underground caverns in a nuclear island powerhouse of an underground nuclear power plant, including: two primary caverns accomodating nuclear reactor powerhouses, combined caverns, electric powerhouse caverns, pressure relief caverns, a first primary traffic tunnel, a second primary traffic tunnel, a third primary traffic tunnel, a top adit system, a ground adit system, secondary traffic tunnels, and a side traffic tunnel. Each combined cavern and each electric powerhouse cavern are disposed at two sides of each primary cavern, respectively. Two combined caverns are in end-to-end connection and the arrangement direction of the two combined caverns are in parallel to the connecting line of the medial axes of the two primary caverns. Each pressure relief cavern is disposed between each combined cavern and a corresponding electric powerhouse cavern.

12 Claims, 3 Drawing Sheets

(51) Int. Cl.
*E21D 13/00* (2006.01)
*E02D 29/00* (2006.01)
*E21D 9/14* (2006.01)
*G21C 1/00* (2018.01)

(56) References Cited

U.S. PATENT DOCUMENTS

| | | | | |
|---|---|---|---|---|
| 3,068,654 A * | 12/1962 | Warren | ............... | B65G 5/00 299/10 |
| 3,996,751 A * | 12/1976 | Hallenius | ............... | E21D 13/00 376/260 |
| 4,167,087 A * | 9/1979 | Schabert | ............... | G21C 13/00 109/15 |
| 4,363,563 A * | 12/1982 | Hallenius | ............... | B65G 5/00 405/53 |
| 4,474,506 A * | 10/1984 | Sagefors | ............... | B65G 5/00 405/132 |
| 4,572,707 A * | 2/1986 | Sagefors | ............... | E21D 13/00 405/53 |
| 4,708,522 A * | 11/1987 | Bergman | ............... | G21F 9/34 376/272 |
| 4,708,523 A * | 11/1987 | Sagefors | ............... | E21D 13/00 405/129.35 |
| 4,971,752 A * | 11/1990 | Parker | ............... | G21C 9/02 376/272 |
| 5,746,540 A * | 5/1998 | Hindle | ............... | G21D 1/003 376/273 |
| 5,855,452 A * | 1/1999 | Sagefors | ............... | E21D 13/00 405/133 |
| 6,597,755 B2 * | 7/2003 | Seefeld | ............... | G21C 9/00 294/82.24 |
| 2010/0303192 A1 * | 12/2010 | Antignano | ............... | G21D 1/00 376/273 |
| 2011/0247328 A1 * | 10/2011 | DuBois | ............... | F03G 6/045 60/641.3 |
| 2014/0161217 A1 * | 6/2014 | Rump | ............... | G21D 1/00 376/273 |
| 2015/0131769 A1 * | 5/2015 | Larrion | ............... | A62B 1/02 376/282 |

\* cited by examiner

CONSTRUCTION LAYOUT FOR UNDERGROUND CAVERNS IN NUCLEAR ISLAND POWERHOUSE OF UNDERGROUND NUCLEAR POWER PLANT

CROSS-REFERENCE TO RELATED APPLICATIONS

This application is a continuation-in-part of International Patent Application No. PCT/CN2015/079879 with an international filing date of May 27, 2015, designating the United States, and further claims foreign priority benefits to Chinese Patent Application No. 201410264520.3 filed Jun. 13, 2014, and to Chinese Patent Application No. 201420316976.5 filed Jun. 13, 2014. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a construction layout for underground caverns in a nuclear island powerhouse of an underground nuclear power plant.

Description of the Related Art

Conventional construction layouts for caverns of an underground nuclear power plant leave much to be desired. In general, the distribution of the caverns is irregular, which means that parts of the terrain are heavily excavated posing hidden risks. In addition, the random distribution of the primary caverns adversely affects the construction of adits. This delays the construction time and increases the investment cost.

SUMMARY OF THE INVENTION

In view of the above-described problems, it is one objective of the invention to provide an improved construction layout for caverns of an underground nuclear power plant that is highly modularized and allows for expedient construction of the power plant.

To achieve the above objective, in accordance with one embodiment of the invention, there is provided a construction layout for underground caverns in a nuclear island powerhouse of an underground nuclear power plant. The construction layout comprises: two primary caverns accomodating nuclear reactor powerhouses, combined caverns, electric powerhouse caverns, pressure relief caverns, a first primary traffic tunnel, a second primary traffic tunnel, a third primary traffic tunnel, a top adit system, a ground adit system, secondary traffic tunnels, and a side traffic tunnel. A connecting line of medial axes of two primary caverns accomodating nuclear reactor powerhouses is perpendicular to a longitudinal direction of a mountain. A combined cavern and an electric powerhouse cavern are disposed at two sides of each of the two primary caverns accomodating nuclear reactor powerhouses, respectively. Two combined caverns are in end-to-end connection and an arrangement direction of the two combined caverns are in parallel to the connecting line of the medial axes of the two primary caverns accomodating nuclear reactor powerhouses. A pressure relief cavern is disposed between each combined cavern and the corresponding electric powerhouse cavern. Outer sides of caverns in the two combined caverns are connected to a side traffic tunnel disposed outside the two combined caverns via the secondary traffic tunnels. Two ends of the side traffic tunnel are connected to the first primary traffic tunnel and the third primary traffic tunnel arranged in the longitudinal direction of the mountain. The first primary traffic tunnel and the third primary traffic tunnel are disposed outside two end faces of the two combined caverns, respectively. The second primary traffic tunnel is arranged in the longitudinal direction of the mountain between the first primary traffic tunnel and the third primary traffic tunnel and is connected to a middle part of the two connected combined caverns. Each of the first primary traffic tunnel, the second primary traffic tunnel, and the third primary traffic tunnel communicates with a ground surface. The two primary caverns, the combined caverns, the electric powerhouse caverns and the pressure relief caverns form a cavern group of the nuclear island powerhouse of the underground nuclear power plant. A skewback or an endwall of an arch crown of each cavern of the cavern group communicates with the ground surface via the top adit system functioned in construction. A bottom of a sidewall or a bottom of an endwall of each cavern of the cavern group communicates with the first primary traffic tunnel, the second primary traffic tunnel, and the third primary traffic tunnel via the ground adit system functioned as a slag discharging channel.

In a class of this embodiment, the top adit system comprises: a first primary adit, a first top adit of a first primary cavern, a second top adit of a second primary cavern, a second primary adit, a third primary adit, a fourth primary adit, third top adits of the electric powerhouse caverns, a fourth top adit of a first pressure relief cavern, and a fifth top adit of a second pressure relief cavern. The first primary adit, the second primary adit, the third primary adit, and the fourth primary adit are arranged in the longitudinal direction of the mountain and communicate with the ground surface. An elevation of the first primary adit is higher than an elevation of the second primary adit, an elevation of the third primary adit, and an elevation of the fourth primary adit. The first primary adit is connected to skewbacks of arch crowns of the two primary caverns accomodating nuclear reactor powerhouses via the first top adit and the second top adit, respectively. The second primary adit and the fourth primary adit are connected to endwalls of arch crowns of two ends of the two connected combined caverns. The third primary adit are connected to a sekwback of an arch crown of the middle part of the two connected combined caverns. A middle part of the third primary adit is branched to form two third top adits connected to endwalls of arch crowns of the two electric powerhouse caverns. The third primary adit is branched to form the fourth top adit connected to a skewback of an arch crown of the first pressure relief cavern. The fourth primary adit is branched to form the fifth top adit connected to a skewback of an arch crown of the second pressure relief cavern. The fourth top adit is disposed between the third top adit of the first electric powerhouse cavern and the first combined cavern.

In a class of this embodiment, each top adit of the top adit system has a longitudinal slope smaller than 9%.

In a class of this embodiment, the ground adit system comprises: a first bottom adit of the first primary cavern, a second bottom adit of an end part of a first combined cavern, a third bottom adit of a first electric powerhouse cavern, a fourth bottom adit of the middle part of the two connected combined caverns, a fifth bottom adit of the first pressure relief cavern, a sixth bottom adit of a second primary cavern, a seventh bottom adit of the second pressure relief cavern, an eighth bottom adit of an end part of a second combined cavern, and a ninth bottom adit of a second electric powerhouse cavern. A middle section of the first primary traffic tunnel is branched to form the third bottom adit connected to an endwall of the first electric powerhouse cavern. A middle section of the second primary traffic tunnel is branched to form the ninth bottom adit connected to an endwall of the second electric powerhouse cavern. The second primary traffic tunnel is connected to a bottom of a sidewall of the first primary cavern and a bottom of the first pressure relief cavern via the first bottom adit and the fifth bottom adit, respectively. The third primary traffic tunnel is connected to a bottom of a sidewall of the second primary cavern and a bottom of the second pressure relief cavern via the sixth bottom adit and the seventh bottom adit, respectively. The first primary traffic tunnel is connected to a bottom of a sidewall of one end of the two connected combined caverns via the second bottom adit. The ninth bottom adit is connected to a bottom of a sidewall of the middle part of the two connected combined caverns via the fourth bottom adit. And the seventh bottom adit is connected to a bottom of a sidewall of the other end of the two connected combined caverns via the eighth bottom adit.

In a class of this embodiment, each bottom adit of the ground adit system has a longitudinal slope smaller than 15%.

In a class of this embodiment, each of the combined caverns comprises: a first safe powerhouse cavern, a nuclear fuel powerhouse cavern, a second safe powerhouse cavern, and a nuclear auxiliary powerhouse cavern connected in series in a direction perpendicular to the longitudinal direction of the mountain. The nuclear auxiliary powerhouse cavern of the first combined cavern is connected to the first safe powerhouse cavern of the second combined cavern. The second bottom adit is connected to a bottom of a sidewall of the first safe powerhouse cavern disposed at one end of the two connected combined caverns. The fourth bottom adit is connected to a bottom of a sidewall of the nuclear auxiliary powerhouse cavern disposed at the middle part of the two connected combined caverns. The eighth bottom adit is connected to a bottom of a sidewall of the nuclear auxiliary powerhouse cavern disposed at the other end of the two connected combined caverns. The second primary adit is connected to an endwall of an arch crown of the first safe powerhouse caverndisposed at one end of the two connected combined caverns. The fourth primary adit is connected to an endwall of an arch crown of the nuclear auxiliary powerhouse cavern disposed at the middle part of the two connected combined caverns. The third primary adit is connected to is connected to an endwall of an arch crown of the nuclear auxiliary powerhouse cavern disposed at the other end of the two connected combined caverns.

In a class of this embodiment, each of the two primary caverns communicates with a corresponding electric powerhouse cavern via a primary steam channel communicating with the ground surface. The two primary caverns accomodating nuclear reactor powerhouses communicate with the ground surface via corresponding apparatus conveying channels, respectively.

Advantages of the construction layout of the underground caverns of the nuclear island powerhouse of the underground nuclear power plant according to embodiments of the invention are summarized as follows:

The primary traffic tunnels having the elevation of ±0 m are fully utlized to construct bottom adits of the powerhouse caverns as the slag dischaging channels and to construct top adits of the powerhouse caverns as the construction channels communicating with the ground surface, so that the construction of the powerhouse caverns can be organized using the fewest construction channels according to the ore pass method (the ore pass method refers to arrange a slage discharging pit in a vertical direction between an upper channel and a lower channel in an excavation region, use the upper channel as the construction channel, and introduce slags produced in the construction to the lower channel via the slag dischaging pit so as to carry the slag out of the construction site). Each powerhouse cavern is only provided with the bottom adits and the top adits. The top adit system communicates with the arch crowns of the powerhouses and the ground adit system communicates with the bottom of the walls of the powerhouses. Since the elevation difference between the bottom elevation of the pressure relief cavern and the elevation of the primary traffic tunnels reaches 20 m, it is difficult to arrange the bottom adits having proper slops, therefore, the bottom adits of the pressure relief caverns are firstly connected horizontally to the axes of the pressure relief caverns and then connected to the bottoms of the pressure relief caverns by arranging the slag discharging pits.

The bottom adits arranged at the bottom layer of the combined caverns which are formed by the nuclear auxiliary powerhouse caverns, the second safe powerhouse caverns, the nuclear fuel powerhouse caverns, and the first safe powerhouse caverns, the CAVERNS IN NUCLEAR reactor powerhouses, the electric powerhouse caverns, and the pressure relief caverns all communicate with the primary traffic tunnel. The top adits arranged at the top layer of the combined caverns which are formed by the nuclear auxiliary powerhouse caverns, the second safe powerhouse caverns, the nuclear fuel powerhouse caverns, and the first safe powerhouse caverns, the CAVERNS IN NUCLEAR reactor powerhouses, the electric powerhouse caverns, and the pressure relief caverns all communicate with the second traffic tunnel, the third traffic tunnel, and the fourth traffic tunnel.

As possessing the highest arch crowns, the CAVERNS IN NUCLEAR reactor powerhouses are unable to share common construction channels with other caverns either on the vertical face or the horizontal face, thus, a separate first primary adit is arranged. The first primary adit is bifurcated to form two top adits of the two primary caverns accomodating nuclear reactor powerhouses respectively connected to the skewbacks of the two primary caverns accomodating nuclear reactor powerhouses.

The construction layout of the invention has fewest construction channels arranged according to the ore pass method. The construction layout of the invention is short, safe, economical, highly modularized, and convenient for construction, which satisfies the general requirement of the construction.

DETAILED DESCRIPTION OF THE EMBODIMENTS

For further illustrating the invention, experiments detailing a construction layout for underground caverns in a nuclear island powerhouse of an underground nuclear power plant are described below. It should be noted that the following examples are intended to describe and not to limit the invention.

Figure 1:
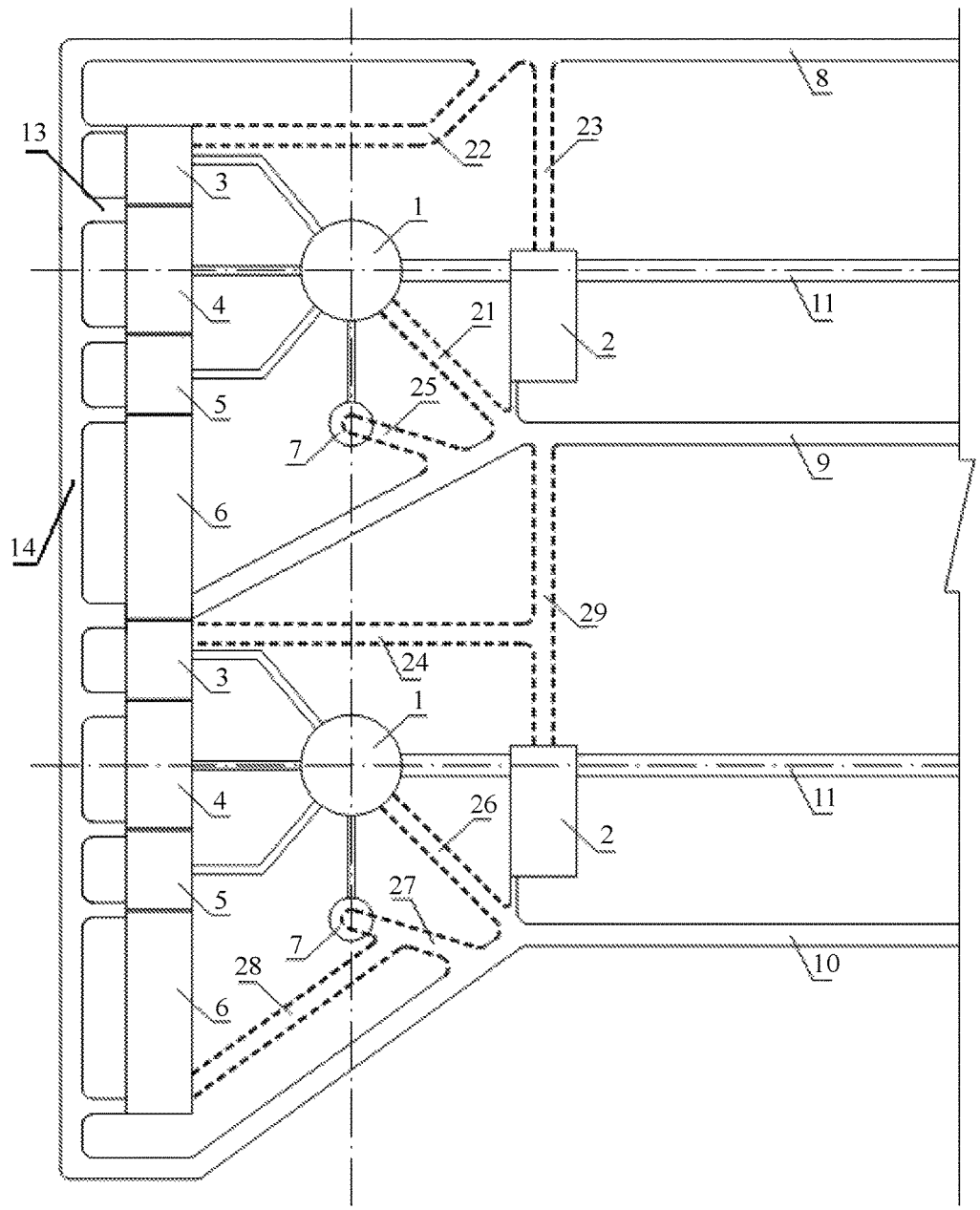
FIG. 1 is a structure diagram of a ground adit system of a construction layout for underground caverns in a nuclear island powerhouse of an underground nuclear power plant in accordance to one embodiment of the invention.
Figure 2:
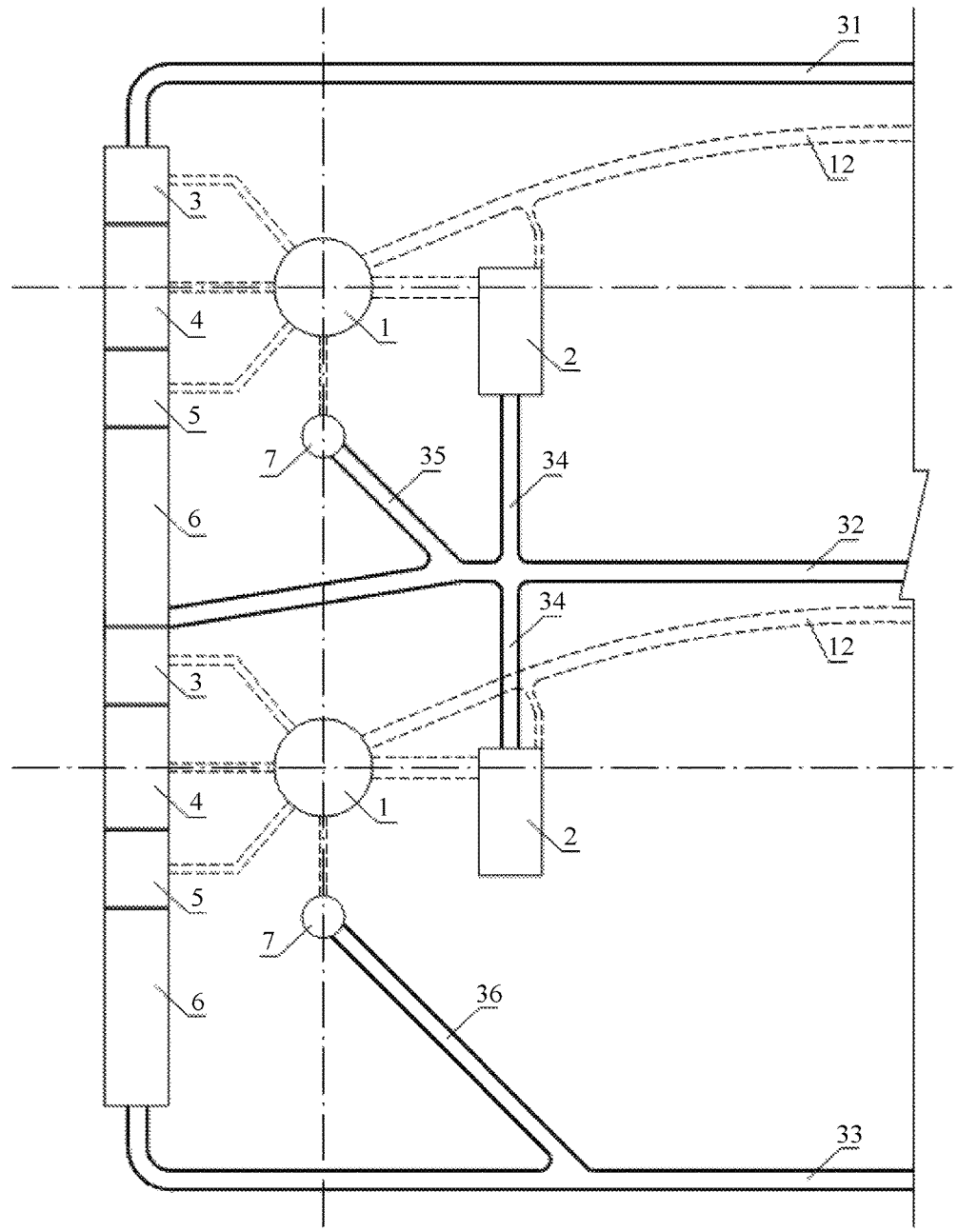
FIG. 2 is a structure diagram of a top adit system, combined caverns, electric powerhouse caverns, and pressure relief caverns of a construction layout for underground caverns in a nuclear island powerhouse of an underground nuclear power plant in accordance to one embodiment of the invention.
Figure 3:
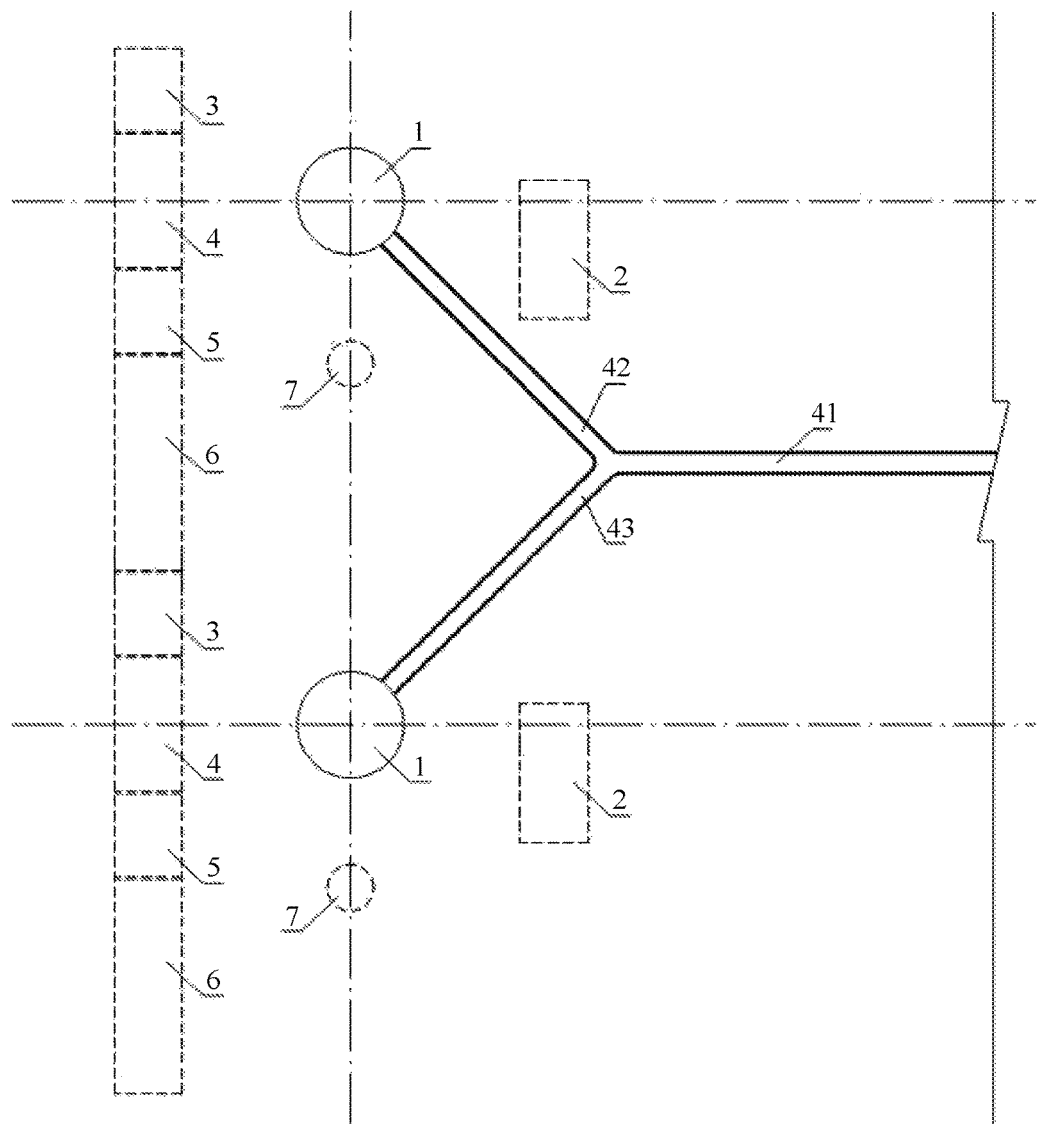
FIG. 3 is a structure diagram of primary caverns and a top adit system of a construction layout for underground caverns in a nuclear island powerhouse of an underground nuclear power plant in accordance to one embodiment of the invention.

As shown in FIGS. 1-3, a construction layout for underground caverns in a nuclear island powerhouse of an underground nuclear power plant comprises: two primary caverns accomodating nuclear reactor powerhouses 1, combined caverns, electric powerhouse caverns 2, pressure relief caverns 7, a first primary traffic tunnel 8, a second primary traffic tunnel 9, a third primary traffic tunnel 10, a top adit system, a ground adit system, a primary steam channel 11, a device conveying channel 12, secondary traffic tunnels 13, and a side traffic tunnel 14.

Two primary caverns accomodating nuclear reactor powerhouses 1 are provided. A connecting line of medial axes of the two primary caverns accomodating nuclear reactor powerhouses is perpendicular to a longitudinal direction of a mountain. A combined cavern and an electric powerhouse cavern 2 are disposed at two sides of each of the two primary caverns accomodating nuclear reactor powerhouses 1, respectively. Two combined caverns are in end-to-end connection and an arrangement direction of the two combined caverns are in parallel to the connecting line of the medial axes of the two primary caverns accomodating nuclear reactor powerhouses 1. A pressure relief cavern 7 is disposed between each combined cavern and the corresponding electric powerhouse cavern 2. Outer sides of caverns in the two combined caverns are connected to a side traffic tunnel 14 disposed outside the two combined caverns via the secondary traffic tunnels 13. Two ends of the side traffic tunnel 14 are connected to a first primary traffic tunnel 8 and a third primary traffic tunnel 10 arranged in the longitudinal direction of the mountain. The first primary traffic tunnel 8 and the third primary traffic tunnel 10 are disposed outside two end faces of the two combined caverns, respectively. A second primary traffic tunnel 9 is arranged in the longitudinal direction of the mountain between the first primary traffic tunnel 8 and the third primary traffic tunnel 10 and is connected to a middle part of the two connected combined caverns. each of the first primary traffic tunnel 8, the second primary traffic tunnel 9, and the third primary traffic tunnel 10 communicates with a ground surface. A nuclear island powerhouse cavern group is formed by the two primary caverns accomodating nuclear reactor powerhouses 1, the combined caverns, the electric powerhouse caverns 2, and pressure relief caverns 7. A skewback or an endwall of an arch crown of each cavern of the cavern group communicates with the ground surface via the top adit system functioned in construction. And a bottom of a sidewall or a bottom of an endwall of each cavern of the cavern group communicates with the first primary traffic tunnel 8, the second primary traffic tunnel 9, and the third primary traffic tunnel 10 via the ground adit system functioned as a slag discharging channel.

Each of the combined caverns comprises: a first safe powerhouse cavern 3, a nuclear fuel powerhouse cavern 4, a second safe powerhouse cavern 5, and a nuclear auxiliary powerhouse cavern 6 connected in series in a direction perpendicular to the longitudinal direction of the mountain. The nuclear auxiliary powerhouse cavern 6 of the first combined cavern is connected to the first safe powerhouse cavern 3 of the second combined cavern.

The top adit system comprises: a first primary adit 41, a first top adit 42 of a first primary cavern, a second top adit 43 of a second primary cavern, a second primary adit 31, a third primary adit 32, a fourth primary adit 33, third top adits 34 of the electric powerhouse caverns, a fourth top adit 35 of a first pressure relief cavern, and a fifth top adit 36 of a second pressure relief cavern. The first primary adit 41, the second primary adit 31, the third primary adit 32, and the fourth primary adit 33 are arranged in the longitudinal direction of the mountain and communicate with the ground surface. An elevation of the first primary adit 41 is higher than an elevation of the second primary adit 31, an elevation of the third primary adit 32, and an elevation of the fourth primary adit 33. The first primary adit 41 is connected to skewbacks of arch crowns of the two primary caverns accomodating nuclear reactor powerhouses 1 via the first top adit 42 and the second top adit 43, respectively. The second primary adit 31 is connected to an endwall of an arch crown of the first safe powerhouse cavern 3 disposed at one end of the two connected combined caverns. The fourth primary adit 33 is connected to an endwall of an arch crown of the nuclear auxiliary powerhouse cavern 6 disposed at the middle part of the two connected combined caverns. The third primary adit 32 is connected to is connected to an endwall of an arch crown of the nuclear auxiliary powerhouse cavern 6 disposed at the other end of the two connected combined caverns. A middle part of the third primary adit 32 is branched to form two third top adits 34 connected to endwalls of arch crowns of the two electric powerhouse caverns 2. The third primary adit 32 is branched to form the fourth top adit 35 connected to a skewback of an arch crown of the first pressure relief cavern 7. The fourth primary adit 33 is branched to form the fifth top adit 36 connected to a skewback of an arch crown of the second pressure relief cavern 7. The fourth top adit 35 is disposed between the third top adit 34 of the first electric powerhouse cavern and the first combined cavern. Each top adit of the top adit system has a longitudinal slope smaller than 9% to satisfy the requirement of trackless transportation.

The ground adit system comprises: a first bottom adit 21 of the first primary cavern, a second bottom adit 22 of an end part of a first combined cavern, a third bottom adit 23 of a first electric powerhouse cavern, a fourth bottom adit 24 of the middle part of the two connected combined caverns, a fifth bottom adit 25 of the first pressure relief cavern, a sixth bottom adit 26 of a second primary cavern, a seventh bottom adit 27 of the second pressure relief cavern, an eighth bottom adit 28 of an end part of a second combined cavern, and a ninth bottom adit 29 of a second electric powerhouse cavern. A middle section of the first primary traffic tunnel 8 is branched to form the third bottom adit 23 connected to an endwall of the first electric powerhouse cavern 2. A middle section of the second primary traffic tunnel 9 is branched to form the ninth bottom adit 29 connected to an endwall of the second electric powerhouse cavern 2. The second primary traffic tunnel 9 is connected to a bottom of a sidewall of the first primary cavern 1 and a bottom of the first pressure relief cavern 7 via the first bottom adit 21 and the fifth bottom adit 25, respectively. The third primary traffic tunnel 10 is connected to a bottom of a sidewall of the second primary cavern 1 and a bottom of the second pressure relief cavern 7 via the sixth bottom adit 26 and the seventh bottom adit 27, respectively. The first primary traffic tunnel 8 is connected to a bottom of a sidewall of the first safe powerhouse cavern 3 disposed at one end of the two connected combined caverns via the second bottom adit 22. The ninth bottom adit 29 is connected to a bottom of a sidewall of the nuclear auxiliary powerhouse cavern 6 disposed at the middle part of the two connected combined caverns via the fourth bottom adit 24. The seventh bottom adit 27 is connected to a bottom of a sidewall of the nuclear auxiliary powerhouse cavern 6 disposed at the other end of the two connected combined caverns via the eighth bottom adit 28. Each bottom adit of the ground adit system has a longitudinal slope smaller than 15% to satisfy the requirement of trackless transportation.

Each of the two primary caverns accomodating nuclear reactor powerhouses 1 communicates with a corresponding electric powerhouse cavern 2 via a primary steam channel 11 communicating with the ground surface. The two primary caverns accomodating nuclear reactor powerhouses 1 are provided with corresponding apparatus conveying channels 12 communicating with the ground surface. The primary steam channel 11 and the apparatus conveying channels 12 are optionally adopted as constructing channels.

The underground nuclear power plant of this embodiment adopts the CUP 600 arrangement of the double reactors. The ore pass method is adopted to organize the excavation of the underground powerhouse caverns, that is, the excavation is organized on an upper working face, and slags are discharged from a bottom working face via a slag discharging pit. The ore pass method is able to satisfy the construction requirement by fewest construction channels. Thus, it only requires designing the ground adit system and the top adit system to communicate with the powerhouse caverns. The bottom adits are in bifurcate arrangement based on the first primary traffic tunnel 8, the second primary traffic tunnel 9, and the third primary traffic tunnel 10, and the top adits are in bifurcate arrangement based on the first primary adit 41, the second primary adit 31, the third primary adit 32, and the fourth primary adit 33, which is beneficial for reducing the project quantity of the project construction. The ground adit system and the top adit system keep a certain distance away from the adjacent caverns for ensuring the stability and safety of the cavern group. The excavated adits are few, the excavated distance is short, and the spaces between the adits and the caverns are proper, so that the cost is saved and the whole project is safe. Because the powerhouse caverns in the CUP600 arrangement of the double reactors adopt modularized design, the modularization design is realized in the structure of the invention, which is specifically as follows:

Because the first primary traffic tunnel 8, the second primary traffic tunnel 9, and the third primary traffic tunnel 10 used as the permanent channels and the primary steam channel 11 optionally used as the channel are all arranged at the elevation of ±0 m, which is greatly different from bottom elevations of the powerhouse caverns: for example, the bottom elevation of the nuclear reactor powerhouse cavern 1 is −9.0 m, the bottom elevation of the combined cavern is −12.5 m, the bottom elevation of the electric powerhouse cavern 12 is −12.5 m, and the bottom elevation of the pressure relief cavern 7 is +20.0 m. Thus, the first primary traffic tunnel 8, the second primary traffic tunnel 9, and the third primary traffic tunnel 10 used as the permanent channels and the primary steam channel 11 optionally used as the channel cannot be directly utilized in either a horizontal face or a vertical face. In order to satisfy the requirement for discharging the excavated slag of the cavern bottoms, it is necessary to arrange the bottom adits to the cavern bottoms. In the meanwhile, in order to reduce the excavation rate of the mountain, to reduce the negative factors affecting the stability of the caverns, and to decrease the cost on the bottom adits, no primary bottom adit is individually designed, while the first primary traffic tunnel 8, the second primary traffic tunnel 9, and the third primary traffic tunnel 10 used as the permanent channels are fully utilized and bifurcated to form the bottom adits 21, 22, 23, 24, 25, 26, 27, and 28 to reach the bottom elevation of the caverns. As an elevation difference between the pressure relief cavern 7 and the primary traffic tunnels reach 20 m, it is difficult to arrange bottom audit having proper slop, thus, the fifth bottom adit 25 and the seventh bottom adit 27 are horizontally connected to the axis of the pressure relief cavern 7 and then connected to the bottom of the pressure relief cavern 7 by arranging a vertical slag discharging pit. The slops of the bottom pits are all smaller than 12% to satisfy the requirement of trackless transportation.

Because the top elevations of the powerhouse caverns are high and vary from one another. For example, the top elevation of the two primary caverns accomodating nuclear reactor powerhouses 1 is +78.0 m, the top elevation of the combined cavern is +57.85 m, the top elevation of the electric powerhouse cavern 2 is +46.8 m, and the top elevation of the pressure relief cavern is +62.0 m, thus the first primary traffic tunnel 8, the second primary traffic tunnel 9, and the third primary traffic tunnel 10 as the permanent channels cannot be directly utilized in either a horizontal face or a vertical face. In addition, the elevation of the apparatus conveying channel 12 is +20.0 m, which is greatly different from the elevation of the cavern, thus, it is necessary to design top adits to connect to the skewback or the endwall of the arch crown of each cavern. As the arch crown of the two primary caverns accomodating nuclear reactor powerhouses 1 is highest and is unable to share a common construction channel with other caverns in either the vertical face or the horizontal face, the first primary adit 41 is separately designed and bifurcated to form the first top adit 42 and the second top adit 43 to connect to the skewbacks of the arch crowns of corresponding caverns of the two primary caverns accomodating nuclear reactor powerhouses 1 having an elevation of +65.0 m. Although the combined caverns, the electric powerhouse caverns 2, and the pressure relief caverns 7 are different in their top elevations, the height differences in the vertical face are relatively small, the three kinds of caverns share the third primary adit 32 and the fourth primary adit 33. The third primary adit 32 and the fourth primary adit 33 are bifurcated to form the third top adits 34, the fourth top adit 35, and the fifth top adit 36. The third top adits 34, the fourth top adit 35, and the fifth top adit 36, and the second primary adit 31 are connected to the elevation of the skewbacks of the caverns. The second primary adit 31, the third primary adit 32, and the fourth primary adit 33 are connected to the endwalls of the arch crowns of the combined caverns having the elevation of +48.0 m. The third top adit 32 is bifurcated to form the third top adits 34 to connect to the endwalls of the arch crowns of the electric powerhouse caverns 2 having the elevation of +37.0 m. The third primary adit 32 and the fourth primary adit 33 are bifurcated to form the fourth top adit 35 and the fifth top adit 36 to reach the skewbacks of the arch crowns of the pressure relief caverns 7 having the elevation of +52.0 m. Because each of the combined caverns comprises four powerhouses and the axis of each of the combined caverns is relatively long, the second primary adit 31, the third primary adit 32, and the fourth primary adit 33, the second bottom adit 22, the fourth bottom adit 24, and the eighth bottom adit 28 are particularly arragned so as to enhace the working face, balance the construction period, and facilitate the supporting of the skewbacks therefore ensur the stability and safety during the construction period of the skewbacks. The slops of the top adits are all smaller than 9% to satisfy the requirement of trackless transportation.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A construction layout for underground caverns in a nuclear island powerhouse of an underground nuclear power plant, the construction layout comprising:
   a) two primary caverns accommodating nuclear reactor powerhouses;
   b) two assemblies of combined caverns;
   c) two electric powerhouse caverns;
   d) two pressure relief caverns;
   e) a first primary traffic tunnel;
   f) a second primary traffic tunnel;
   g) a third primary traffic tunnel;
   h) a top adit system;
   i) a ground adit system;
   j) secondary traffic tunnels; and
   k) a side traffic tunnel;
   wherein:
   a connecting line of centers of cross-sections of the two primary caverns at a horizontal plane is perpendicular to a longitudinal direction of a mountain, wherein the horizontal plane is parallel to a ground surface and the longitudinal direction of the mountain;
   each cavern of the two assemblies of combined caverns and the two electric powerhouse caverns comprises a rectangular cross-section having a longitudinal axis at the horizontal plane;
   each assembly of combined caverns and each electric powerhouse cavern are disposed at two sides of one primary cavern, respectively; the two assemblies of combined caverns are in end-to-end connection and the longitudinal axis of each cavern of the two assemblies of combined caverns and the two electric powerhouse caverns is in parallel to the connecting line of the centers of cross-sections of the two primary caverns; each pressure relief cavern is disposed between one assembly of combined caverns and a corresponding electric powerhouse cavern;
   outer sides of caverns in the two assemblies of combined caverns are connected to a side traffic tunnel disposed outside the two assemblies of combined caverns via the secondary traffic tunnels; two ends of the side traffic tunnel are connected to the first primary traffic tunnel and the third primary traffic tunnel arranged along the longitudinal direction of the mountain;
   the two assemblies of combined caverns are disposed between the first primary traffic tunnel and the third primary traffic tunnel; the second primary traffic tunnel is arranged along the longitudinal direction of the mountain between the first primary traffic tunnel and the third primary traffic tunnel and is connected to a middle part of the two assemblies of combined caverns;
   each of the first primary traffic tunnel, the second primary traffic tunnel, and the third primary traffic tunnel communicates with the ground surface;
   the two primary caverns, the two assemblies of combined caverns, the two electric powerhouse caverns and the two pressure relief caverns form a cavern group of the nuclear island powerhouse of the underground nuclear power plant;
   the top adit system communicates with the ground surface;
   skewbacks or endwalls of top arches of caverns of the cavern group communicate with the ground surface via the top adit system;
   bottoms of sidewalls of caverns of the cavern group communicate with the first primary traffic tunnel, the second primary traffic tunnel, and the third primary traffic tunnel via the ground adit system; and bottoms of sidewalls of caverns of the cavern group communicate with the ground surface via the first primary traffic tunnel, the second primary traffic tunnel, and the third primary traffic tunnel;
   the top adit system is adapted for excavating caverns;
   the first primary traffic tunnel, the second primary traffic tunnel, and the third primary traffic tunnel are adapted for discharging excavated materials; and
   the top adit system is disposed at a higher elevation with respect to the first primary traffic tunnel, the second primary traffic tunnel, and the third primary traffic tunnel.

2. The layout of claim 1, wherein:
   the top adit system comprises: a first primary adit, a first top adit, a second top adit, a second primary adit, a third primary adit, a fourth primary adit, two third top adits, a fourth top adit, and a fifth top adit;
   the first primary adit, the second primary adit, the third primary adit, and the fourth primary adit are arranged along the longitudinal direction of the mountain and communicate with the ground surface; an elevation of the first primary adit is higher than an elevation of the second primary adit, an elevation of the third primary adit, and an elevation of the fourth primary adit;
   the first primary adit is connected to skewbacks of arch crowns of the two primary caverns via the first top adit and the second top adit, respectively;
   the second primary adit and the fourth primary adit are connected to endwalls of arch crowns of two ends of the two assemblies of combined caverns; the third primary adit are connected to a skewback of an arch crown of the middle part of the two assemblies of combined caverns;
   a middle part of the third primary adit is branched to form the two third top adits connected to endwalls of arch crowns of the two electric powerhouse caverns; the third primary adit is branched to form the fourth top adit connected to a skewback of an arch crown of one of the two pressure relief caverns; the fourth primary adit is branched to form the fifth top adit connected to a skewback of an arch crown of the other of the two pressure relief caverns; and
   the fourth top adit is disposed between one of the two third top adits and the two assemblies of combined caverns.

3. The layout of claim 2, wherein each top adit of the top adit system has a longitudinal slope smaller than 9%.

4. The layout of claim 3, wherein each of the two primary caverns communicates with a corresponding electric powerhouse cavern via a primary steam channel communicating with the ground surface; and the two primary caverns communicate with the ground surface via corresponding apparatus conveying channels, respectively.

5. The layout of claim 2, wherein:
the ground adit system comprises: a first bottom adit, a second bottom adit, a third bottom adit, a fourth bottom adit, a fifth bottom adit, a sixth bottom adit, a seventh bottom adit, an eighth bottom adit, and a ninth bottom adit;
a middle section of the first primary traffic tunnel is branched to form the third bottom adit connected to an endwall of one of the two electric powerhouse caverns; a middle section of the second primary traffic tunnel is branched to form the ninth bottom adit connected to an endwall of the other of the two electric powerhouse caverns;
the second primary traffic tunnel is connected to a bottom of a sidewall of one of the two primary caverns and a bottom of one of the two pressure relief caverns via the first bottom adit and the fifth bottom adit, respectively;
the third primary traffic tunnel is connected to a bottom of a sidewall of the other of the two primary caverns and a bottom of the other of the two pressure relief caverns via the sixth bottom adit and the seventh bottom adit, respectively; and
the first primary traffic tunnel is connected to a bottom of a sidewall of one end of the two assemblies of combined caverns via the second bottom adit; the ninth bottom adit is connected to a bottom of a sidewall of the middle part of the two assemblies of combined caverns via the fourth bottom adit; and the seventh bottom adit is connected to a bottom of a sidewall of the other end of the two assemblies of combined caverns via the eighth bottom adit.

6. The layout of claim 5, wherein each bottom adit of the ground adit system has a longitudinal slope that is smaller than 15%.

7. The layout of claim 6, wherein each of the two primary caverns communicates with a corresponding electric powerhouse cavern via a primary steam channel communicating with the ground surface; and the two primary caverns communicate with the ground surface via corresponding apparatus conveying channels, respectively.

8. The layout of claim 5, wherein:
each of the two assemblies of combined caverns comprises: a first safe powerhouse cavern, a nuclear fuel powerhouse cavern, a second safe powerhouse cavern, and a nuclear auxiliary powerhouse cavern which are connected in series along a direction perpendicular to the longitudinal direction of the mountain; the nuclear auxiliary powerhouse cavern of one of the two assemblies of combined caverns is connected to the first safe powerhouse cavern of the other of the two assemblies of combined caverns;
the second bottom adit is connected to a bottom of a sidewall of the first safe powerhouse cavern disposed at one end of the two assemblies of combined caverns; the fourth bottom adit is connected to a bottom of a sidewall of the nuclear auxiliary powerhouse cavern disposed at the middle part of the two assemblies of combined caverns; the eighth bottom adit is connected to a bottom of a sidewall of the nuclear auxiliary powerhouse cavern disposed at the other end of the two assemblies of combined caverns; and
the second primary adit is connected to an endwall of an arch crown of the first safe powerhouse cavern disposed at one end of the two assemblies of combined caverns; the fourth primary adit is connected to an endwall of an arch crown of the nuclear auxiliary powerhouse cavern disposed at the middle part of the two assemblies of combined caverns; and the third primary adit is connected to an endwall of an arch crown of the nuclear auxiliary powerhouse cavern disposed at the other end of the two assemblies of combined caverns.

9. The layout of claim 8, wherein each of the two primary caverns communicates with a corresponding electric powerhouse cavern via a primary steam channel communicating with the ground surface; and the two primary caverns communicate with the ground surface via corresponding apparatus conveying channels, respectively.

10. The layout of claim 5, wherein each of the two primary caverns communicates with a corresponding electric powerhouse cavern via a primary steam channel communicating with the ground surface; and the two primary caverns communicate with the ground surface via corresponding apparatus conveying channels, respectively.

11. The layout of claim 2, wherein each of the two primary caverns communicates with a corresponding electric powerhouse cavern via a primary steam channel communicating with the ground surface; and the two primary caverns communicate with the ground surface via corresponding apparatus conveying channels, respectively.

12. The layout of claim 1, wherein each of the two primary caverns communicates with a corresponding electric powerhouse cavern via a primary steam channel communicating with the ground surface; and the two primary caverns communicate with the ground surface via corresponding apparatus conveying channels, respectively.

* * * * *